Aug. 21, 1951 K. R. SPACE 2,564,822
DUST RECEPTACLE
Filed Nov. 29, 1949
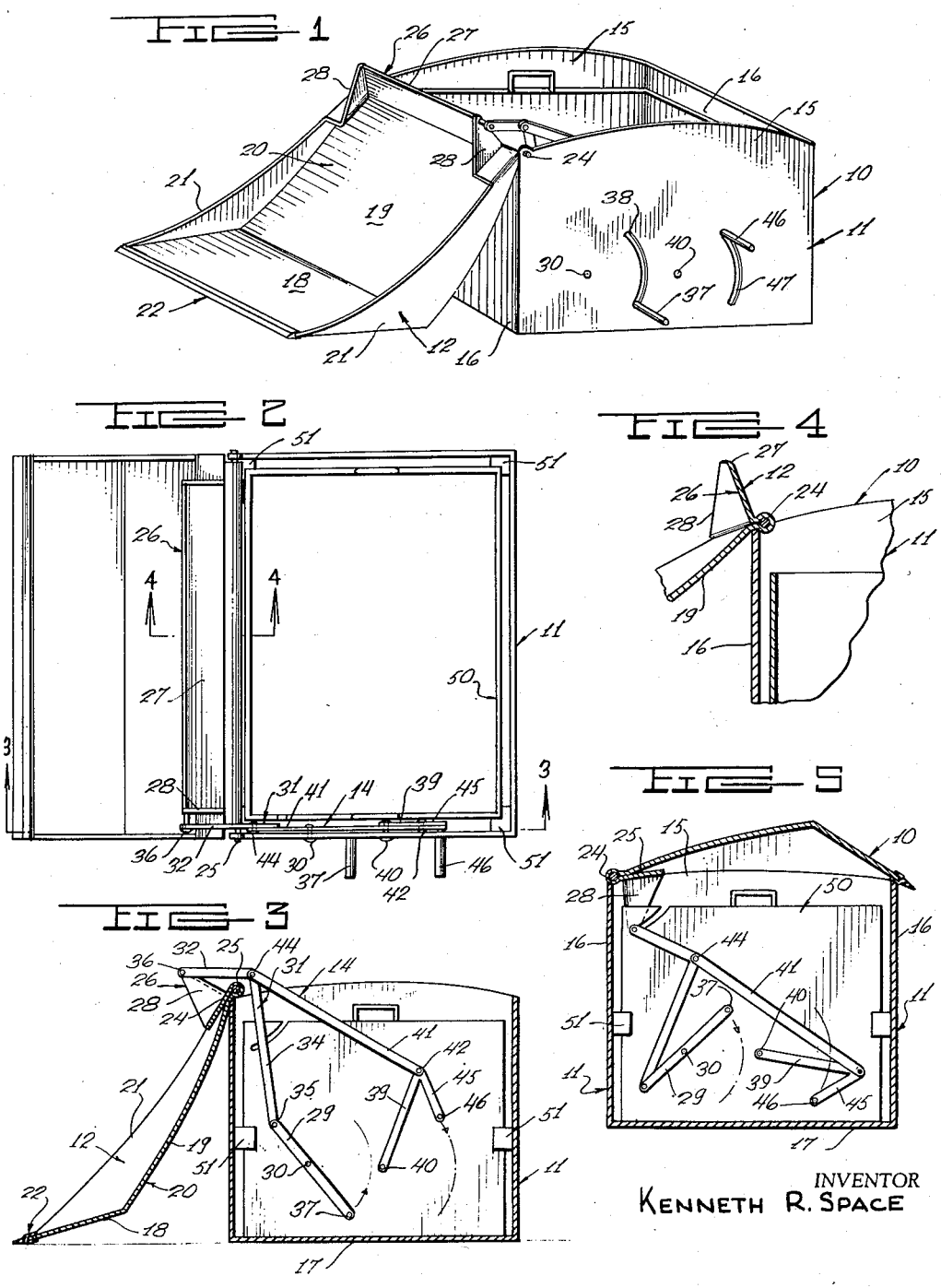
INVENTOR
KENNETH R. SPACE Patented Aug. 21, 1951

2,564,822

UNITED STATES PATENT OFFICE 2,564,822

DUST RECEPTACLE

Kenneth R. Space, Westport, Conn.

Application November 29, 1949, Serial No. 129,986

3 Claims. (Cl. 65—20)

This invention relates to an improved dust receptacle, and more particularly to a combined dust bin and chute, wherein the chute constitutes the closure or cover member for dust bin.

It is an object of this invention to provide a dust receptacle of the kind to be more particularly described hereinafter having a dust bin open on the upper end thereof and a chute hingedly mounted on the dust bin, and novel operating means for swinging the chute to a dust bin opening position, wherein the chute constitutes a shovel member into which dust, dirt and other material from the floor may be swept or pushed to be subsequently deposited within the dust bin upon hinging of the chute to a closed position.

Another object of this invention is to provide a device of this kind having operating levers or pedals for swinging the closure member or chute from a dust bin closing position to an open position, the pedals being operable upon depression thereof for swinging the chute to a selected position. A separate pedal or lever is provided for swinging the chute to the opened and closed positions.

Another object of this invention is to provide a combined dust bin and chute of this kind having a pedal for swinging the chute to a dust-receiving position and a separate pedal for swinging the closure to a dust bin closing position, the operating means between the pedal and the closure member being substantially concealed within the dust bin.

Still another object of this invention is to provide a receptacle of this kind having a hinged closure chute swingable through a distance greater than 180°, approximately 210°, from the fully open to the fully closed position thereof, and having separate operating means for swinging the closure member to its open and closed positions.

Still a further object of this invention is to provide a combined chute and dust bin of this kind having an inner, removable container slidably engaged within the dust bin for readily removing the contents which have been swept from the floor and deposited within the dust bin.

With the above and other objects in view, my invention consists in the arrangement, combination and details of construction disclosed in the drawings and specification, and then more particularly pointed out in the appended claims.

In the drawings:

Figure 1 is a perspective view of the combined chute and dust bin constructed according to an embodiment of this invention, showing the chute in its fully open position;

Figure 2 is a top plan view with the chute in the open position;

Figure 3 is a transverse vertical section taken on the line 3—3 of Figure 2;

Figure 4 is a fragmentary detail transverse vertical section taken on the line 4—4 of Figure 2;

Figure 5 is a transverse vertical section taken at one end of the receptacle, showing the chute in its fully closed position.

Referring to the drawings, the numeral 10 designates generally a dust receptacle constructed according to an embodiment of this invention. The receptacle is composed of a dust bin 11 open at its upper end having a chute 12 hinged at the upper end of a side wall thereof. Toggle linkage 14 are pivotally connected between the dust bin 11 and the chute 12 for swinging the chute from a fully open to a fully closed position overlying the upper open end of the dust bin, as shown in Figure 5 of the drawings.

The dust bin 11 is provided with a pair of spaced-apart end walls 15 connected together by front and rear walls 16, on one of which the chute 12 is hinged, the walls 15 and 16 being fixedly secured, or formed integrally with, the marginal edges of a bottom wall 17.

The chute 12 is formed of a pair of angularly related top wall members 18 and 19 which are fixedly secured together to constitute the top wall 20 of the chute 12. End walls 21 are fixedly secured to the opposite ends of the top walls 18 and 19 forming the side walls of the chute 12. A resilient rubber edging strip 22 is carried by the free edge of the top wall member 18, to form a bumper or edge which may flushly engage with the surface of the floor when brushing or sweeping dirt from the floor into the chute 12. A hinge pin 24 is carried by the dust bin 11 and engages through a rolled edge 25 of the top wall member 19 of the chute 12 for hingedly securing the chute to the upper edge of one of the walls 16, of the dust bin 11, as clearly shown in the drawings.

One end of the member 19 of the chute top 20 is directed at right angles to form a lever arm 26. The lever arm 26 is formed as a transversely elongated plate 27 extending across the chute 12 with the opposite ends of the plate 27 terminating inwardly from the side walls 21, as clearly shown in Figures 1 and 2 of the drawings. The plate 27, which constitutes the lever 26, is secured to the side walls 21 of the chute 12 by the inwardly directed side panels 28.

The linkage carried by the dust bin 11 and connected with the chute 12 is composed of an opening lever 29 pivoted intermediate its ends on a pivot pin 30 mounted on an end wall 15 of the dust bin, as clearly shown in Figures 3 and 5 of the drawings. A bell-crank 31 is formed with a horizontally extending arm 32 and a vertically extending arm 34. The lower end of the vertically extending lever arm 34 is hingedly connected by the pivot pin 35 to one end of the opening lever 29. The outer end of the horizontally extending lever arm 32 is pivotally connected by a pivot pin 36 to the adjacent end of the lever arm 26, of the chute 12. The connection between the horizontally extending lever arm 32 and the vertically extending lever arm 26 is positioned above the hinge pin 24 in the open position of the chute 12 and is positioned below the hinge pin 24 in its closed position, as shown in Figure 5 of the drawings. In other words, the lever arm 26 of the chute 12 is moved from a depending position in the closed position of the chute, shown in Figure 5 of the drawings, to an upwardly and outwardly declining position in the open position of the chute, as clearly shown in Figure 3 of the drawings.

A pedal 37 is fixed on the free end of the lever 29 and extends outwardly through a slot 38 in one dust bin end wall 15, the lever 29 and bell crank 31 being positioned at the inner side of the same dust bin wall 15. The slot 38 within which the opening pedal 37 is slidably engaged is formed as an arc about the pivot 30 which pivotally mounts the lever 29 to the end wall 15.

For closing the chute 12 from its open position, shown in Figure 3 of the drawings, the swinging of the pivot point 36 upwardly and inwardly over the hinge pin 24 is accomplished by depressing a closing lever 39 which is pivotally mounted at its lower end to the same end wall 15 on which the opening lever 29 is mounted by a pivot pin 40. A link 41 is pivoted at 42 to the upper end of the opening lever 39 and its other end is pivotally connected by a pivot pin 44 to the inner end of the horizontally extending lever arm 32 of the bell crank 31. The pivot pin 44 which connects the link 41 to the horizontally extending lever arm 32 will always be positioned laterally inwardly from the hinge pin 24.

A declining arm 45 is formed on the free end of the lever 39 and extends beneath the lever 39 and has a pedal 46 on its free end which extends outwardly through a slot 47 formed in the end wall 15, the slot 47 being spaced transversely from the slot 38, described above. A pivot pin 30 on which the opening lever 29 is mounted, and the pivoted pin 40 of the closing lever 39 are positioned in substantially the same horizontal plane so that when the chute 12 is open the opening pedal 37 will be positioned at the lower end of the slot 38, and the opening pedal 46 will be positioned at the upper end of its slot 47, and in the closed position of the chute 12, the pedals will be in opposite positions so that the proper pedal will be always most easily reached by a person using the device.

An inner, removable and preferably disposable lining or container 50 is adapted to be carried within the dust bin 11. Suitable corner blocks or posts 51 are fixedly secured to the inside corners of the dust bin 11 for properly positioning the container 50 therein.

In the use and operation of the device 10, described above, the opening pedal 37 will be initially depressed to the position shown in Figure 1 of the drawings, whereby the chute 12 will be moved to its fully open position with the top wall member 18 substantially flatly overlying the floor or surface from which the dirt or dust is to be swept. The inner receptacle or container 50 is then positioned within the dust bin 11 to be properly positioned therein by the corner blocks or members 51. Upon depression of the closing pedal 46, the lever 39 and link 41 will pull the bell crank 31 inwardly of the receptacle 11 and thereby close the chute 12 and deposit the dirt or dust thereon into the inner, removable container 50. When a suitable amount of dirt is deposited within the container 50, the container 50 may be removed and disposed of as desired.

I do not mean to confine myself to the exact details of construction herein disclosed, but claim all variations falling within the purview of the appended claims.

I claim:

1. In a dust receptacle, a dust bin having an open upper end, a chute hinged on the upper end of a side wall of said dust bin to swing from a closed position upon the upper end to the dust bin to an open position extending downwardly and laterally outwardly from said dust bin, a lever arm fixed on said chute to depend within the dust bin in the closed position of the chute and to extend upwardly in the open position of the chute, a bell crank pivoted at one end to said lever arm and depending within said dust bin and pivoted on the dust bin, a first lever pivoted intermediate its ends on the dust bin, a pivot connecting one end of said first lever to the other end of said bell crank, a pedal on the other end of said first lever, said pedal extending from said dust bin and being operable upon depression thereof to swing said chute from closed position to open position, a second lever pivoted at one end on said dust bin, a link pivoted at one end to the other end of the second lever and at the other end to said bell crank, and a second pedal on the second lever and extending from the dust bin, said second pedal being operable upon depression thereof to swing the chute from open position to closed position.

2. In a dust receptacle, a dust bin open at the upper side thereof, a chute, hinge means mounting said chute on said dust bin to swing from a closed position overlying the upper side of the dust bin to an outwardly declining open position at the side of the dust bin, a lever arm fixed on said chute to depend within the dust bin in the closed position of the chute and to extend upwardly therefrom in the open position of the chute, a bell crank having a substantially horizontal arm pivoted to said lever arm, and swingable from a substantially horizontal position below said hinge means in the closed position of the chute to a substantially horizontal position above said hinge means in the open position of the chute, and a depending vertical arm, a first lever pivoted on the dust bin for vertical swinging movement and engaging said vertical arm of the bell crank, a pedal on said first lever operable upon depression thereof to swing said chute from closed position to open position, a second lever pivoted on the dust bin for vertical swinging movement, a link pivotally connected to and between said second lever and said horizontal arm of the bell crank, and a pedal on said second lever operable upon depression thereof to swing the chute from open position to closed position.

3. In a dust receptacle, a dust bin having an open upper end, a chute, means hinging one end of said chute on the upper end of a side of said dust bin to swing laterally outwardly and downwardly into a declining open position at the side of the dust bin from a closed position upon the upper end of the dust bin, said chute having a lever arm fixed on said one end thereof arranged to depend into the dust bin in the closed position of the chute and to project upwardly and laterally outwardly with respect to the side of the dust bin in the open position of the chute, first pedal-operated means mounted on said dust bin and connected to said lever arm for swinging said chute from closed to open position, and second pedal-operated means connected to said lever arm for swinging said chute from open to closed position, said first and second means comprising first and second linkages mounted on and within the dust bin, each linkage including a pedal extending through a side wall of the dust bin through a vertical slot formed therein, the pedals being positioned in laterally spaced relation with the pedals being positioned at opposite ends of the slots.

KENNETH R. SPACE.

REFERENCES CITED

The following references are of record in the file of this patent:

UNITED STATES PATENTS

| Number | Name | Date |
| --- | --- | --- |
| 642,412 | Anderson | Jan. 30, 1900 |
| 735,360 | Furrow | Aug. 4, 1903 |
| 769,436 | Gentry | Sept. 6, 1904 |
| 914,484 | Gabel | Mar. 9, 1909 |
| 932,227 | Workman | Aug. 24, 1909 |
| 1,018,410 | Danielli | Feb. 27, 1912 |
| 1,498,341 | Binder | June 17, 1924 |
| 2,124,349 | Herbster | July 19, 1938 |
| 2,164,407 | Jarchow | July 4, 1939 |
| 2,237,836 | Macaluso | Apr. 8, 1942 |

FOREIGN PATENTS

| Number | Country | Date |
| --- | --- | --- |
| 470,706 | Great Britain | Aug. 18, 1937 |
| 115,494 | Switzerland | July 1, 1926 |